L. C. Chase,
Buckle.

No. 1,483. Reissued May 26, 1863.

Witnesses:

N. Ames
Geo Carpenter

Inventor.

L. C. Chase

N. PETERS, PHOTO-LITHOGRAPHER, WASHINGTON, D. C.

UNITED STATES PATENT OFFICE.

LUCIUS C. CHASE, OF BOSTON, MASSACHUSETTS.

GIRTH-BUCKLE.

Specification forming part of Letters Patent No. 26,013, dated November 8, 1859; Reissue No. 1,483, dated May 26, 1863.

*To all whom it may concern:*

Be it known that I, LUCIUS C. CHASE, of Boston, in the county of Suffolk and Commonwealth of Massachusetts, have invented a new and useful Improvement in Buckles; and I do hereby declare that the following is a full, clear, and exact description of the construction and operation of the same, reference being had to the accompanying drawings, forming a part of this specification, in which—

Figure 1:
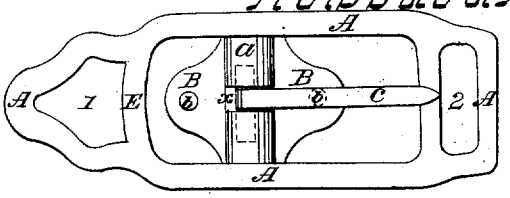
Figure 4:
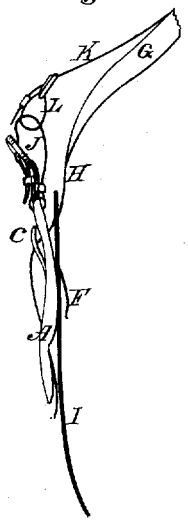
Figure 2:
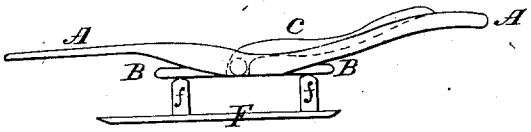
Figure 3:
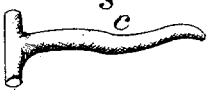

Figure 1 is a top view of the buckle; Fig. 2, a side view of the same, showing also a couple of starts or rivets, *f f*, and a flat piece of metal, F, to which said starts or rivets are attached; and Fig. 3, a view of the tongue removed from the frame.

Like parts are indicated by the same letters in all the drawings.

The nature of my invention consists in constructing a buckle with one or more stationary or movable wings or flanges, provided with one or more holes for the reception of rivets or screws, by means of which the buckle can be confined to a strap or other article with great rapidity and cheapness, saving not only all the labor of sewing, but also all the material that is used in "lapping over" in the usual manner of confining buckles.

To enable others skilled in the art to make and use my improvement, I will now proceed to describe its construction and operation.

My improvement is applicable to buckles of any and every description and construction, one or more of the wings or flanges through which the rivets or screws are passed being attached either to the frame or tongue in any desirable manner. I prefer, however, the construction shown in Fig. 1, in which A is the frame and C the tongue, of iron, brass, or other suitable material.

B and B are wings or flanges cast on the frame A, each wing or flange being provided with one or more holes, *b*, for the reception of rivets or screws; or said wings may be movable—*i. e.*, hinged to the frame. For most purposes I make use of two of these wings or flanges. It is obvious, however, that for many purposes one flange, provided with one or more holes, will answer quite as well as or better than two. It is also obvious that a flange or flanges may be attached to other parts of the frame A and still accomplish the object desired; or, finally, the tongue itself may be provided with one or more flanges and furnished with a hole or holes for screws or rivets.

The tongue C may be attached to the buckle by any of the usual ways. In the drawings, however, it is represented with two arms, *c c*, (vide Fig. 3,) which, after the body of the tongue has been passed from the under side through slot *x*, rest or turn in the semi-cylindrical box *a*, as shown by the dotted lines in Figs. 1 and 2. After the tongue is properly inserted, the buckle is laid flat upon the strap or material to which it is to be confined, and holes are punched in the same corresponding with the holes *b* in the wings B. The rivets *f f* are then put through and headed, and the whole operation is performed much more rapidly than buckles can be attached in the usual manner—*i. e.*, by sewing—and no material is lost in lapping over. In place of simple rivets, screws may be used, or (as shown in Fig. 2) a flat piece, F, with starts or rivets *f f*, may be employed. The under sides of the arms *c c*, resting on the strap or material to which the buckle is attached, are securely kept in place by the box *a*.

Having thus described the construction and operation of my improvement, what I claim, as new, and desire to secure by Letters Patent, is—

Confining a buckle to a strap or other article by means of one or more rivets or screws passing through one or more wings or flanges, substantially as set forth, and for the purpose described.

L. C. CHASE.

Witnesses:
N. AMES,
W. K. SMITH.